United States Patent
Fujibayashi et al.

(10) Patent No.: US 7,006,176 B2
(45) Date of Patent: Feb. 28, 2006

(54) LIQUID CRYSTAL DISPLAY DEVICE COMPRISING A C-DAC AND WHEREIN A LIGHT BLOCKING FILM OPPOSES THE C-DAC AND CONTACTS THE LIQUID CRYSTAL

(75) Inventors: Sadayasu Fujibayashi, Saitama-ken (JP); Tomonobu Motai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/295,864

(22) Filed: Nov. 18, 2002

(65) Prior Publication Data

US 2004/0212760 A1    Oct. 28, 2004

(30) Foreign Application Priority Data

Nov. 21, 2001 (JP) ............................. 2001-356376

(51) Int. Cl.
*G02F 1/1333* (2006.01)
*G02F 1/1335* (2006.01)
*G09G 5/00* (2006.01)

(52) U.S. Cl. ...................... 349/110; 349/111; 349/151; 345/204

(58) Field of Classification Search ................ 349/110
See application file for complete search history.

(56) References Cited

U.S. PATENT DOCUMENTS

| | | | | |
|---|---|---|---|---|
| 5,854,663 | A | * | 12/1998 | Oh et al. ...................... 349/42 |
| 6,002,463 | A | * | 12/1999 | Fujikawa .................... 349/110 |
| 6,034,757 | A | * | 3/2000 | Yanagawa et al. .......... 349/141 |
| 6,372,349 | B1 | * | 4/2002 | Hisashi et al. ............. 428/407 |
| 6,597,415 | B1 | * | 7/2003 | Rho et al. ..................... 349/42 |

* cited by examiner

*Primary Examiner*—Andrew Schechter
*Assistant Examiner*—Jeanne Andrea Di Grazio
(74) *Attorney, Agent, or Firm*—Oblon, Spivak, McClelland, Maier & Neustadt, P.C.

(57) ABSTRACT

A liquid crystal display device comprises a poly-silicon TFT substrate having a condenser type digital analog converter, an another substrate disposed so as to face the poly-silicon TFT substrate, and liquid crystal positioned between the poly-silicon TFT substrate and the another substrate. In this liquid crystal device, a light blocking film is formed on a surface of the another substrate and contacts with the liquid crystal. The light blocking film has a resistance larger than $n \cdot \tau / C_{LC}$ wherein n is a number of bits of the condenser type digital analog converter, $\tau$ is an operation stabilizing time of a condenser per one bit, and $C_{LC}$ is electrostatic capacitance between the poly-silicon TFT substrate and the another substrate.

4 Claims, 3 Drawing Sheets

LIQUID CRYSTAL DISPLAY DEVICE COMPRISING A C-DAC AND WHEREIN A LIGHT BLOCKING FILM OPPOSES THE C-DAC AND CONTACTS THE LIQUID CRYSTAL

CROSS-REFERENCE TO RELATED APPLICATIONS

This application is based upon and claims the benefit of priority from Japanese Patent Application No. 2001-356376 filed Nov. 21, 2001; the entire contents of which are incorporated herein by reference.

BACKGROUND OF THE INVENTION

1. Field of the Invention

The present invention relates to a liquid crystal display device having a poly-silicon TFT substrate in which a condenser type digital analog converter is formed.

2. Description of Related Art

A liquid crystal display device having a poly-silicon thin film transistor (hereinafter referred to as TFT) substrate in which a plurality of poly-silicon TFTs are formed has been widely used as a display screen for use in personal computers and the like, which is a large-sized device, as well as a display screen for use in portable devices and the like, which are a small-sized device.

Recent years, a price reduction of the liquid display device has been demanded according to developments in price competition in products incorporating the liquid crystal device. To cope with this need, the development of liquid crystal display devices, which incorporate a condenser type digital analog converter (hereinafter referred to as a C-DAC) for converting image data of a digital signal to an analog signal, has been advanced.

The condenser in the C-DAC requires a certain time until a voltage is stabilized after turning-on a switch for the condenser. Assuming that this time be τ, a time of n·τ is necessary for a C-DAC of n (n: a positive integer) bits.

Incidentally, the liquid crystal display device has a constitution that holds liquid crystal between a poly-silicon TFT substrate and an another substrate disposed so as to face the poly-silicon TFT substrate, and can be considered as being a kind of condenser composed of the poly-silicon TFT substrate and the another substrate. Assuming that the electrostatic capacitance between the poly-silicon TFT substrate and the another substrate be $C_{LC}$, a resistance of a light blocking film disposed on a surface contacting liquid crystal of the another substrate be $R_{BM}$, and the time constant of the electrostatic capacitance be $\tau_{LC}$, the relation expressed by $\tau_{LC} \approx R_{BM} \times C_{LC}$ is established. It is sometimes inevitable owing to limitations in circuit design that the time constant $\tau_{LC}$ is equal to n·τ or less.

However, when the time constant $\tau_{LC}$ is equal to n·τ or less, potential of the condenser of the C-DAC varies during an operation of the C-DAC. Therefore, there has been a problem that a stable output corresponding to image data of n-bits cannot be obtained from the C-DAC and display quality is degraded.

Particularly, in the case that the size of the liquid crystal display device is small, the relation expressed by the equality: $C_{LC}=k \cdot S \cdot L$ is established assuming that a diagonal size of the liquid crystal display device be L, the number of scanning lines be S and a coefficient be k. Then the electrostatic capacitance $C_{LC}$ becomes smaller, as the size of the liquid crystal display device is made smaller. Since the time constant $\tau_{LC}$ becomes smaller as the electrostatic capacitance $C_{LC}$ becomes smaller, the time constant $\tau_{LC}$ is apt to be equal to n·τ or less, and there has been a problem that the C-DAC does not correspond to the number of bits of the image data and image quality is significantly degraded.

SUMMARY OF THE INVENTION

An object of the present invention is to provide a liquid crystal display device having a C-DAC in a poly-silicon TFT substrate at a low price, which is capable of displaying a stable image corresponding to the number of bits of image data.

A liquid crystal display device according to the present invention includes: a poly-silicon TFT substrate having a condenser type digital analog converter; an another substrate disposed so as to face the poly-silicon TFT substrate; a liquid crystal positioned between the poly-silicon TFT substrate and the another substrate; a light blocking film formed on a surface of the another substrate and contacts with the liquid crystal, and having a resistance larger than $n \cdot \tau/C_{LC}$ wherein n is a number of bits of the condenser type digital analog converter, τ is an operation stabilizing time of a condenser per one bit, and $C_{LC}$ is electrostatic capacitance between the poly-silicon TFT substrate and the another substrate.

DETAILED DESCRIPTION OF EMBODIMENTS

Figure 1:
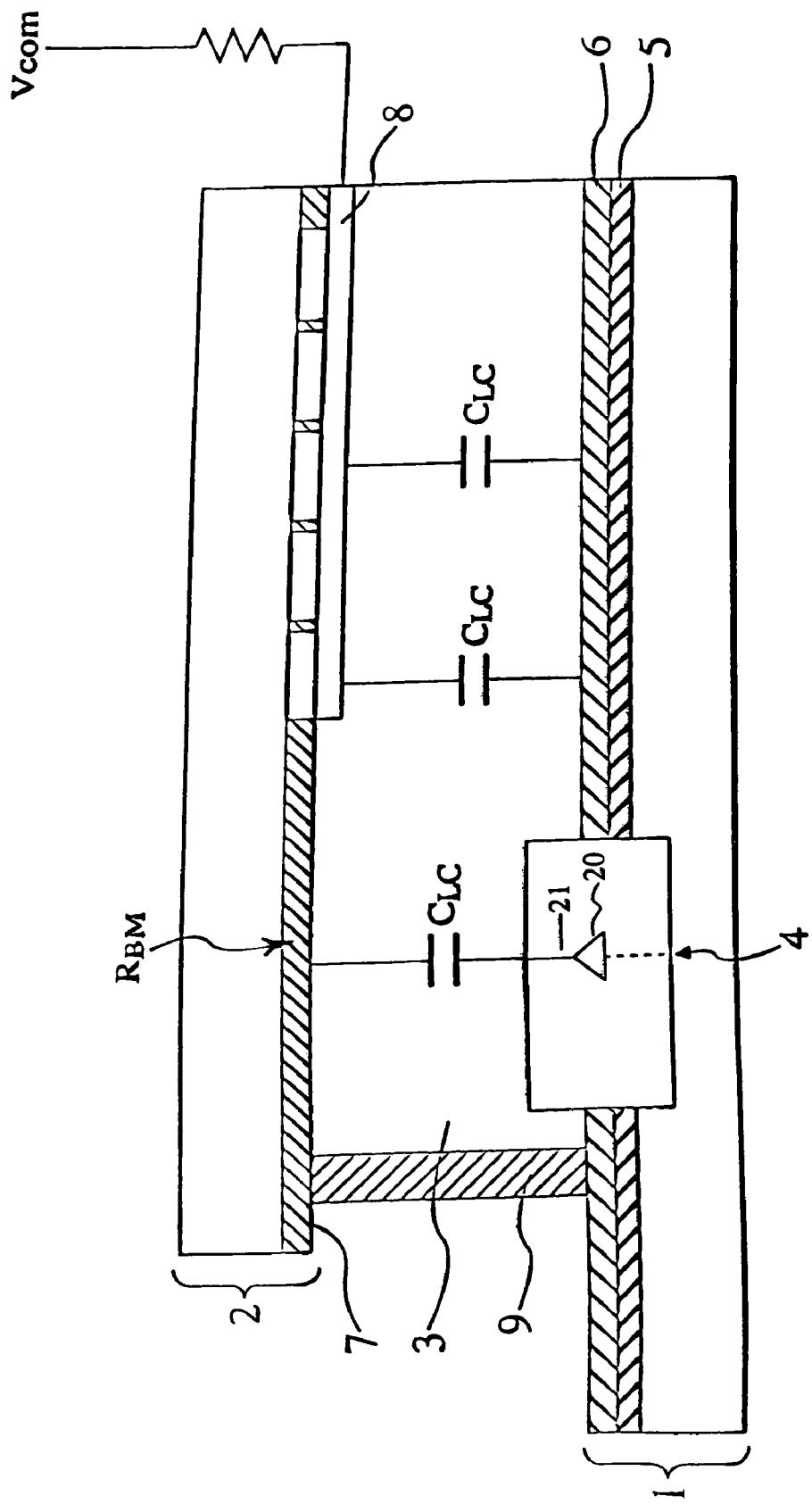
FIG. 1 is a section view illustrating an example of a constitution of a liquid crystal display device according to an embodiment of the present invention.

As shown in FIG. 1, a liquid crystal display device of this embodiment has a constitution whereby a poly-silicon TFT substrate 1, in which a plurality of poly-silicon thin film transistors are formed, and an another substrate 2 disposed so as to face the poly-silicon TFT substrate 1 are joined to each other with a sealing member 9 interposed therebetween, and liquid crystal 3 is positioned in the gap between the poly-silicon TFT substrate 1 and the another substrate 2.

A condenser type digital analog converter (C-DAC) 4 for converting image data of a digital signal to an analog signal is formed in the poly-silicon TFT substrate 1. Interlayer insulating films 5 and 6 are formed on the surface of the poly-silicon TFT substrate 1 and contact with the liquid crystal 3. A light blocking film 7 and a transparent electrode 8 are formed on the surface 2 of the opposite electrode 2 and contact with the liquid crystal 3.

The liquid crystal display device is considered to be a kind of condenser composed of the poly-silicon TFT substrate 1 and the another substrate 2 which sandwich the liquid crystal. Assuming that electrostatic capacitance of the liquid crystal device be $C_{LC}$, resistance of the light blocking film 7 be $R_{BM}$, and a time constant of the electrostatic capacitance be $\tau_{LC}$, the relation expressed by the following equality is established.

$$\tau_{LC} \approx R_{BM} \times C_{LC} \qquad (1)$$

Figure 2:
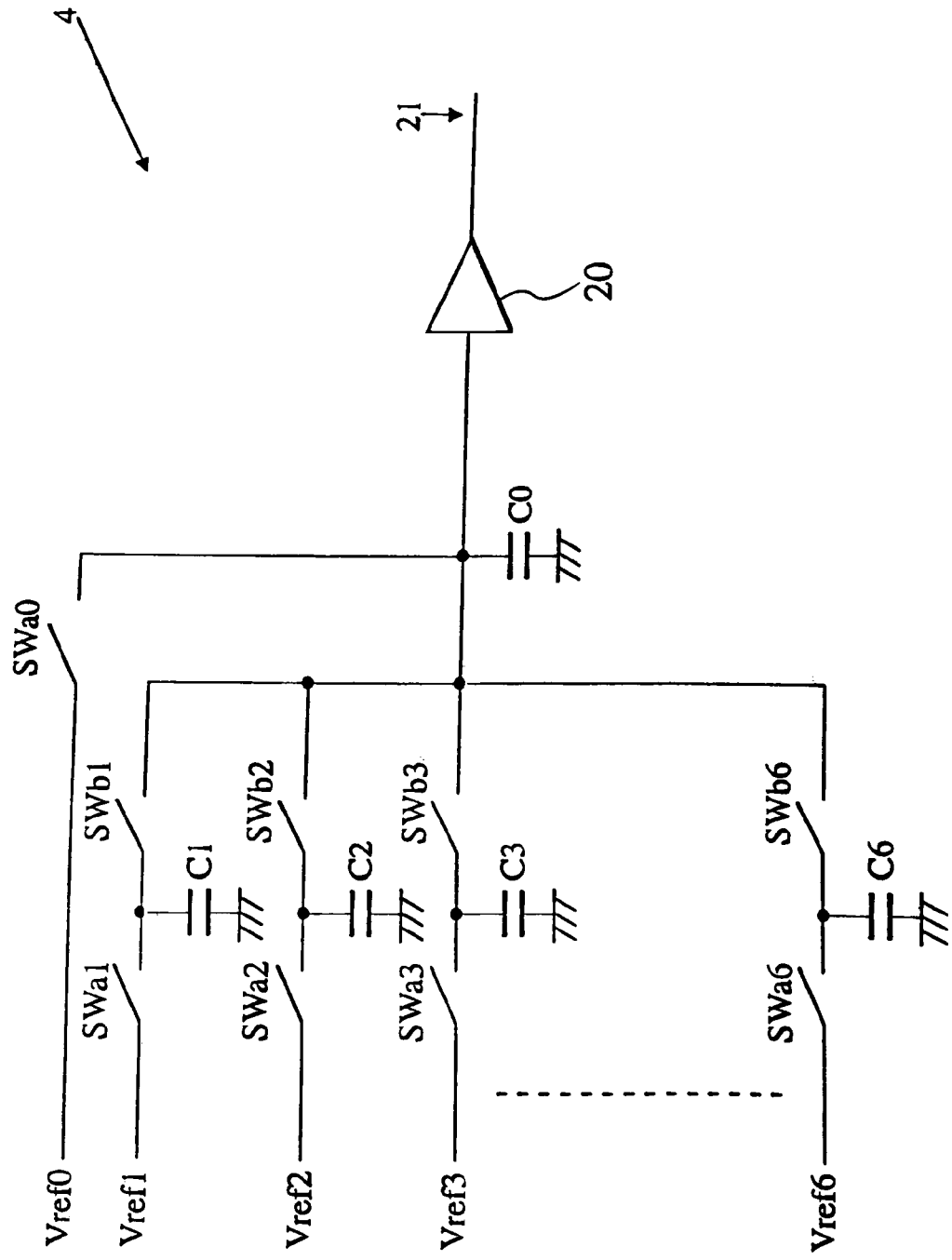
FIG. 2 is a circuit diagram illustrating an example of a constitution of a C-DAC formed in the poly-silicon TFT substrate of FIG. 1.

As shown in FIG. 2, the C-DAC 4 comprises a terminal Vref0 for receiving sign bit of image data, and terminals Vref1 to Vref6 for receiving data of 6 bits of image data. The terminal Vref0 is connected to a condenser C0 via a switch SWa0. The terminal Vref1 is connected to a condenser C1 via a switch SWa1. The condenser C1 is connected to the condenser C0 via a switch SWb1. Other terminals Vref2 to Vref6 are respectively connected to condensers C2 to C6 via switches SWa2 to SWa6. The condensers C2 to C6 are respectively connected to the condenser C0 via the switches SWb2 to SWb6. The condenser C0 is connected to an input terminal of an amplifier 20, and an output terminal of the amplifier 20 is connected to a signal line.

Figure 3:
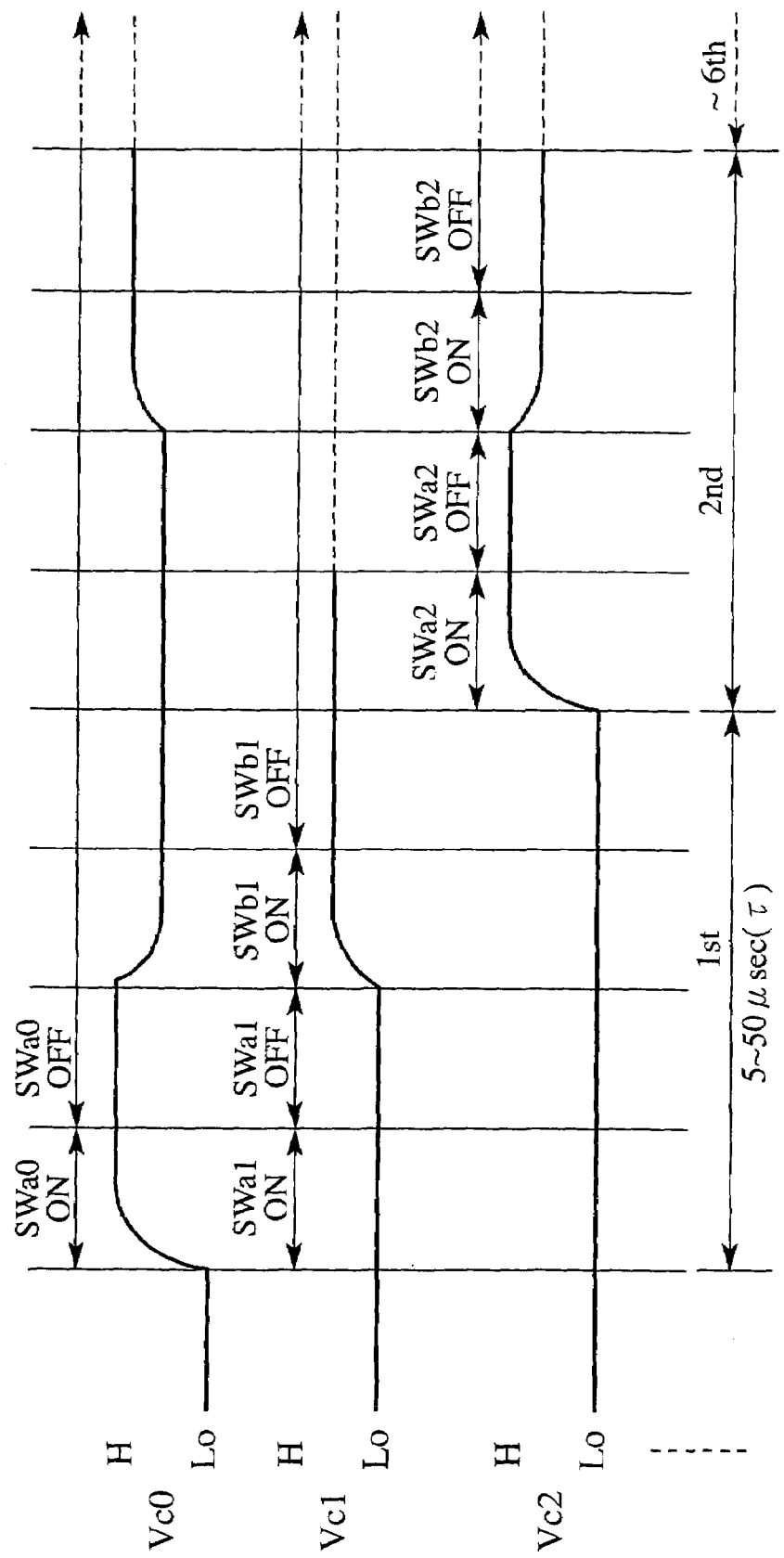
FIG. 3 is a timing chart illustrating an example of a voltage waveform of each condenser in the C-DAC of FIG. 2.

In FIG. 3, Vc0, Vc1, Vc2, ... respectively correspond to the output voltages of the condensers C0, C1, C2, ....

As to the output voltage Vc0, during the period at which the switch SWa0 is turned-on, bit data inputted to the terminal Vref0 has the level of "1", and the condenser C0 is charged during this period. Thus, the voltage waveform rises up.

As to the output voltage Vc1, during the period at which the switch SWa1 is turned on, bit data inputted to the terminal Vref1 has the level of "0", and the condenser C1 is not charged during this period. Accordingly, the voltage waveform does not change while maintaining its level of "0". When the switch SWb1 is turned on after turning off the switch SWa1, the charge stored in the condenser C0 flows out to the condenser C1 and then is stored in the condenser C1.

As to the output voltage Vc2, during the period at which the switch SWa2 is turned on, bit data inputted to the terminal Vref2 has the level of "1", and the condenser C2 is charged during this period, and the voltage waveform rises up. Then, the switch SWa2 is turned-off, and subsequently when the switch SWb2 is turned on, the charge stored in the condenser C2 flow out to the condenser C0, and the condenser C0 is charged.

As described above, the charge is sequentially charged and discharged in the condenser C0 depending on the level of each bit data, and the charge corresponding to the data of 6 bits are finally stored therein. Note that the on-periods of the switches SWa0 and SWa1 are at the same timing in the drawing.

The respective condensers C0 to C6 require a time of 5 to 50 $\mu$sec generally until voltages at the condensers C0 to C6 stabilize after turning on of the switches SWa0 to SWa6. Hereinafter, this time is referred to as an operation stabilization time $\tau$. In the case of the C-DAC 4 described above, the operation stabilization time $6\tau$ of 30 to 300 $\mu$sec is required until a series of operations for 6 bits data is completed.

For this reason, to allow the C-DAC to perform a stable operation, the following relation must be satisfied.

$$\tau_{LC} > n\cdot\tau \qquad (2)$$

However, it is difficult to make the number n of bit and the operation stabilization time $\tau$ fully small because of a limitation to a circuit design.

Accordingly, in this embodiment, it is noted that the equality (2) is expressed by the following equality by use of the equality (1).

$$R_{BM} \times C_{LC} > n\cdot\tau$$

The equality (3) is obtained from the above equality.

$$R_{BM} > n\cdot\tau/C_{LC} \qquad (3)$$

The resistance $R_{BM}$ of the light blocking film 7 is made to be larger than $n\cdot\tau/C_{LC}$ based on the equality (3). A material of the light blocking film 7 is a resin such as resin black matrix (BM) for example, which shows high resistance and is excellent in light blocking effect.

Next, a concrete example of the liquid crystal display device will be described. Herein, two types of 10.4" (XGA) and 2" (QCIF) are supposed as the liquid crystal display device incorporating the 6-bit C-DAC. The electrostatic capacitance $C_{LC}(10")$ of 10.4" (XGA) is 100 nF, and the electrostatic capacitance $C_{LC}(2")$ of 2" (QCIF) is 4 nF. When the operation stabilizing time $\tau$ of the C-DAC is $50\times10^{-5}$ sec, the following equality is established by use of a resin film having a resistance $R_{BM}$ of 1 M $\Omega/cm^2(M\Omega/SQ)$ as the light blocking film.

In the case of the liquid crystal display device of 10.4" (XGA) type:

$$n\cdot\tau/C_{LC}(10") = 6\tau/(100\times10^{-9})$$

$$= 3\times10^3 \ \Omega/cm^2$$

Accordingly, the following inequality (4) is established.

$$R_{BM} \geq n\cdot\tau/C_{LC}(10") \qquad (4)$$

In the case of the liquid crystal display device of 2"(QCIF) type:

$$n\cdot\tau/C_{LC}(2") = 6\tau/(4\times10^{-9})$$

$$= 7.5\times10^4 \ \Omega/cm^2$$

Accordingly, the following inequality (5) is established.

$$R_{BM} \geq n\cdot\tau/C_{LC}(2") \qquad (5)$$

Since the liquid crystal display devices of the 10.4" (XGA) and 2" (QCIF) types satisfy the relation expressed by the equality (3), a stable image corresponding to 6 bit data can be obtained.

When the liquid crystal display device of the 2" (QCIF) type was practically fabricated by use of a poly-silicon TFT substrate incorporating a 6-bits C-DAC and an another substrate in which a resin film having resistance of 1 M$\Omega/cm^2$ was formed as a light blocking film, it was confirmed that a stable image display corresponding to 6-bit data was achieved.

As described above, the light blocking film 7 having the resistance $R_{BM}$ which is larger than $n\cdot\tau/C_{LC}$ is formed on the surface of the another substrate 2 in this embodiment. Since the time constant $\tau_{LC}$ of the electrostatic capacitance becomes larger than the operation stabilizing time $n\cdot\tau$ of the whole n-bits C-DAC with such a constitution, the potential at the condenser of the C-DAC stabilizes, thus making it possible to perform a stable image display corresponding to n-bits image data.

Furthermore, a liquid crystal display device at low price and with high quality can be provided by use of the resin as the material of the light blocking film 7.

What is claimed is:

1. A liquid crystal display device comprising:
   a poly-silicon TFT substrate having a digital analog converter comprising at least one condenser;
   a second substrate disposed so as to face the poly-silicon TFT substrate;

a liquid crystal positioned between the poly-silicon TFT substrate and the second substrate, wherein an electrostatic capacitance $C_{LC}$ is defined as an electrostatic capacitance of the liquid crystal positioned between the poly-silicon TFT substrate and the second substrate; and a light blocking film formed on a surface of the second substrate and in contact with the liquid crystal, and having a resistance larger than $n \cdot \tau / C_{LC}$ wherein n is a number of bits of the digital analog converter, and $\tau$ is an operation stabilizing time of each said at least one condenser per one bit.

2. The liquid crystal display device according to claim 1, wherein a material of the light blocking film is a resin.

3. The liquid crystal display device according to claim 1 or 2, wherein resistance of the light blocking film is 1 M$\Omega$/cm$^2$.

4. The liquid crystal display device according to claim 1, wherein the light blocking film and the digital analog converter face each other with the electrostatic capacitance of the liquid crystal between them.

* * * * *